(12) United States Patent
Li

(10) Patent No.: US 6,847,873 B1
(45) Date of Patent: Jan. 25, 2005

(54) DRIVER INFORMATION FEEDBACK AND DISPLAY SYSTEM

(76) Inventor: Shih-Hsiung Li, 7F-5, No. 23, Sec. 1, Hangchow S. Rd., Taipei (TW)

( * ) Notice: Subject to any disclaimer, the term of this patent is extended or adjusted under 35 U.S.C. 154(b) by 0 days.

(21) Appl. No.: 10/615,539

(22) Filed: Jul. 8, 2003

(51) Int. Cl.[7] .............................................. G06F 7/00
(52) U.S. Cl. ......................... 701/36; 701/35; 701/211; 701/212; 340/438; 340/439
(58) Field of Search .............................. 701/34, 35, 36, 701/60, 211, 212; 340/438, 439

(56) References Cited

U.S. PATENT DOCUMENTS 4,709,265 A * 11/1987 Silverman et al. .......... 348/158
5,596,319 A *  1/1997 Spry ......................... 340/903

* cited by examiner

Primary Examiner—Gertrude A. Jeanglaude
(74) Attorney, Agent, or Firm—William E. Pelton, Esq.

(57) ABSTRACT

A driver information feedback and display system is disclosed. The architecture of the system includes a controller (30), a channel/window manager (10), and front and rear image capture units (11–13). The system can be further incorporated with a speed recorder (40), a backing sensor (50), or a GPS unit (60). When a vehicle enters an intersection from a narrow alley, the left and right image capture units (11,12) installed at the nose of the vehicle will be activated for scanning road conditions on the main road in both directions, thereby eliminating the need for the driver to strain to see the traffic situation or pulling out the car half way. The speed recorder (40) can be used for detection of low speed and activation of left and right image capture units (11, 12). The present system can effectively minimize the chance of vehicle collisions.

7 Claims, 3 Drawing Sheets

DRIVER INFORMATION FEEDBACK AND DISPLAY SYSTEM

BACKGROUND OF THE INVENTION

1. Field of the Invention

The present invention relates to a driver information feedback and display system, in particular to a road condition detection system for automobiles that fully makes use of sophisticated detection devices to monitor road conditions instead of relying only on a driver's eyesight to enhance safe driving, especially for passenger cars.

2. Description of Related Arts

Conventionally, drivers have to rely on rear-view and side view mirrors to monitor the road conditions alongside and behind the vehicle. For more challenging tasks such as lane switching, backing up, parking alongside the road, and passing through narrow alleys, there is virtually no better helper other than the accumulated experience of the driver. However, the latest technological developments have ushered in many innovative driving aids that can relieve many average drivers of such challenges. For example, the backing sensor can help drivers easily accomplish the task of roadside parking and backing out of an alley; the rear camera can help drivers of large and heavy vehicles like trailers, trucks, and buses to monitor the situations around and at the back of their vehicles.

Nonetheless, there are still many situations in which drivers have to rely on their training and experience for making the right judgment instantaneously. Doing the right thing on wide and open roads wide not be so hard for average drivers, but, in situations such as blind corners, sharp curves, or crossing from alleys to the main road, it will be difficult to avoid every potentially dangerous move by the other driver, however wary the driver might be. For example, in the situation depicted by FIG. 3, when the car pulls out from a right angle or blind intersection, the driver in the other car will be caught by surprise.

Although the transportation authorities have erected signs and convex mirrors at the curve sections so that on-coming drivers will be able to detect any pedestrian or car movement through reflection of the mirror, car drivers still have to strain to see or edge their cars out half way in order to see the road conditions on the other side. This is due to the conventional design of cars, in which the driver seats are normally set in the middle section of the car lengthwise, and the nose of car and the driver compartment are separated by the hood. Therefore, when a car pulls out from an alley, the driver normally cannot see on-coming traffic on the main road until the car has already pulled out half way. This surprise move often causes serious accidents for other cars traveling on the main road, as they are not aware of the car turning out from an alley or blind corner, and therefore run into the emerging car.

Such risks also appear when someone backs up on a curved road or backs out from an alley. These unexpected moves certainly are a shock for unprepared drivers on the other side of the road.

Auxiliary aids like backing sensors and rear cameras can help a driver collect useful information with respect to the road conditions in front, at the rear and along side the vehicles for making a correct judgment by the driver. Furthermore, these sensing devices could be linked to automatic controls for activation of accident prevention systems. At present, most of these detection and control devices have to be manually controlled, but for maximum safety, there should be coordinated action by all these detection and control devices, which is the effort of the present invention.

SUMMARY OF THE INVENTION

The main object of the present invention is to provide a road condition detection system that can help drivers collect intelligent information and monitor the road situations in front, at the rear and around the vehicle for enhancing driving safety.

To this end, the above-mentioned road condition detection system in accordance with the present invention should include:

multiple image capture units disposed at the nose and at the back end of the passenger car for capturing the scenes in front and behind the car;

a data display unit acting as a monitor for displaying the captured video images passed along from the image capture units;

a channel/window manager having multiple input ports being connected to all image capture units, and an output being connected to the data display unit;

a controller being connected to all the components mentioned above and acting as the control center, which orders the channel/window manager to perform window splitting and image switching through the input and output control.

This road condition detection system can be especially useful for drivers taking a turn from a blind corner or backing up in an alley. When driving in a narrow alley, the display monitor is automatically set to display the video images fed by the left and right image capture units installed at the nose of the passenger car, and when the passenger car approaches an intersection with a main road, these image capture units will be able to use the wide-angle cameras to scan the road conditions on the main road without having to pull out half way first. The driver's view is much enhanced with the aid of these image capture units that can instantly feed back the video images of the scenes in front and behind the car. As such, the driver can make a correct judgment without facing any risk of an accident with the on-coming traffic.

The two image capture units in front in accordance with the invention are embedded in the headlamp set.

To enhance the capabilities of the road condition detection system, it can be further incorporated with a speed recorder that is able to monitor the driving speed constantly, especially for low speed detection. In that case, the controller is linked to the speed recorder for activation of the front image capture units for automatic scanning.

The controller can also be linked to a backing sensor to enable precise and safe parking.

The road condition detection system can also incorporate a GPS unit, in which the controller is linked to the GPS unit, and the output of GPS unit can be passed along to the data display unit for displaying an electronic map tracking the current location of the car through the synchronous satellite services.

The features and structure of the present invention will be more clearly understood when taken in conjunction with the accompanying drawings.

DETAILED DESCRIPTION OF THE PREFERRED EMBODIMENT

Figure 1:
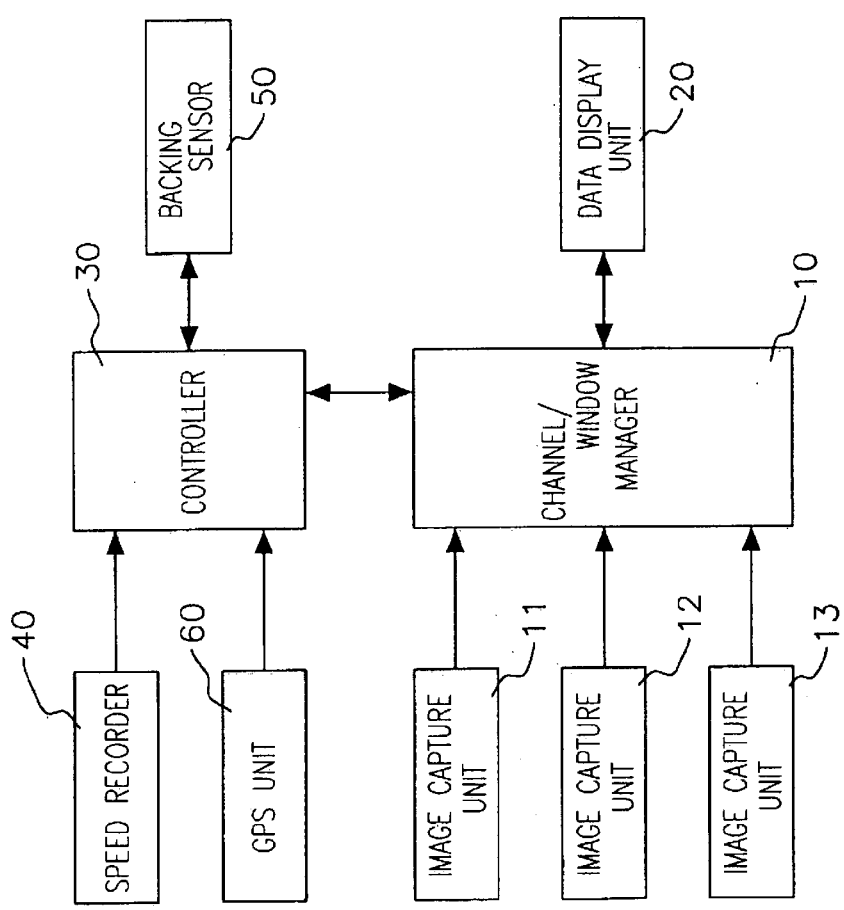
FIG. 1 is a block diagram of the architecture of the present invention.

A preferred embodiment of the present invention is presented as shown in FIG. 1, the road condition detection system in the present invention is formed by a left front image capture unit (11,12), a rear image capture unit (13), a channel/window manager (10), a speed recorder (40), a backing sensor (50), a data display unit (20) and a controller (30). Their architecture and functions are explained as follows:

- the multiple image capture units (11–13) are respectively installed at the front and at the back of the car for capturing scenes in front of and at the back of the car. For the preferred embodiment, the left front image capture unit (11) and the right front image capture unit (12) are respectively embedded in the right and left head lamp sets, and the rear image capture unit (13) having a wide angle lens is normally installed on the central section of the rear bumper. The above-mentioned image capturing devices can be either CCD or CMOS-based image sensors;
- a data display unit (20) is installed inside the passenger compartment as the display monitor for images passed back from the front-end image capture units (11,12) and rear-end image capture unit (13);
- a channel/window manager (10) having multiple input ports respectively connected to front-end image capture units (11,12) and rear-end image capture unit (13), and the output port is connected to the data display unit (20);
- a controller (30) being the control center which is connected to all the components mentioned above, and controlling inputs and outputs of the channel/window manager (10) to enable window splitting and view switching on the screen of the data display unit (20);
- a speed recorder (40) under the control of the controller (30) monitoring the car speed at all times;
- a backing sensor (50) being formed by an ultrasonic transducer and under the control of the controller (30) to transmit/receive radar signals; and
- a GPS unit (60) under the control of the controller (30) enabling the displaying of an electronic map on the data display unit (20) by window splitting to dynamically track the current car and chart the road map through the synchronous satellite services.

Under the original design of the present invention, the speed recorder (40), the backing sensor (50), and the GPS unit (60) are optional units for the road condition detection system, which can be added to the existing system by drivers to create an integrated driver information feedback and display system.

Through the micro-cameras of front-end image capture units (11,12) embedded in the left and right head lamp sets, the driver's view can be can effectively expanded. Since the front-end image capture units (11,12) are positioned on the nose of the passenger car, when the car approaches a blind intersection from an alley, the driver is able to see the traffic on the main road in both directions through the camera lenses of the front-end image capture units (11,12). This is especially suitable for cars with a long hood.

When the car driver activates the left and right micro-cameras at the nose of the car to scan the road conditions, the video images are fed through the channel/window manager (10) and simultaneously displayed on the data display unit (20) through window splitting.

The micro-camera in the rear image capture unit (13) at the back of the car has a wide-angle lens for all around viewing of the scenes behind the car to supplement the rear-view mirror and side mirrors, which usually have blind spots.

The controller (30) not only controls the operation mode of channel/window manager (10), but also checks the car speed with the speed recorder (40), and controls the backing sensor (50).

When backing up or backing out of an alley, the controller (30) activates the backing sensor (50) and the rear image capture unit (13) simultaneously for full scanning. The backing sensor (50) is used to scan and estimate the distance from any obstacles, and the scan result instantly appears on the screen of the data display unit (20) by overlaying. The rear image capture unit (13) is used to capture scenes behind the car through the wide-angle lens, and the video images are then passed to the data display unit (20) through the channel/window manager (10) to supplement the backing sensor (50), which sometimes may have blind spots.

The channel/window manager (10) not only controls the active channel for signal reception, but also controls the window splitting and view switching on the data display unit (20). When the video images from the front-end image capture units (11,12) and rear-end image capture unit (13) are fed to the channel/window manager (10), the controller (30) is able to select the image output on the data display unit (20) by manual control or simultaneously showing of all images on the data display unit (20) through the window splitting technique on a single screen.

The data display unit (20) can be adapted from existing audio/video installation in the passenger car, by connecting the output of the channel/window manager (10) to the video input of the audio/video device, such that the modified data display unit (20) can be used to capture video images fed from the image capture units (11-13).

Figure 2:
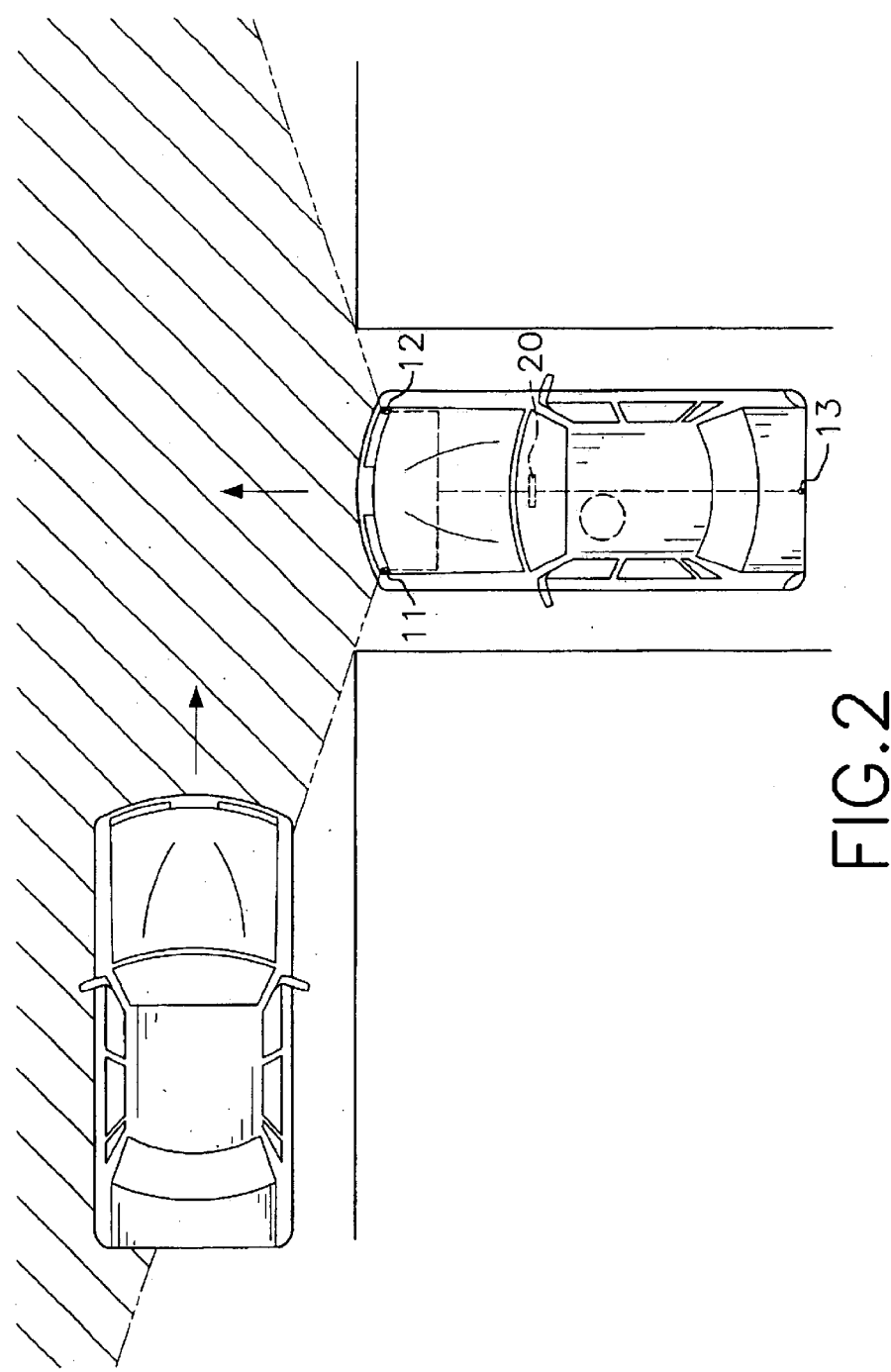
FIG. 2 is a conceptual diagram of the improved views of car driver after using the present invention.
Figure 3:
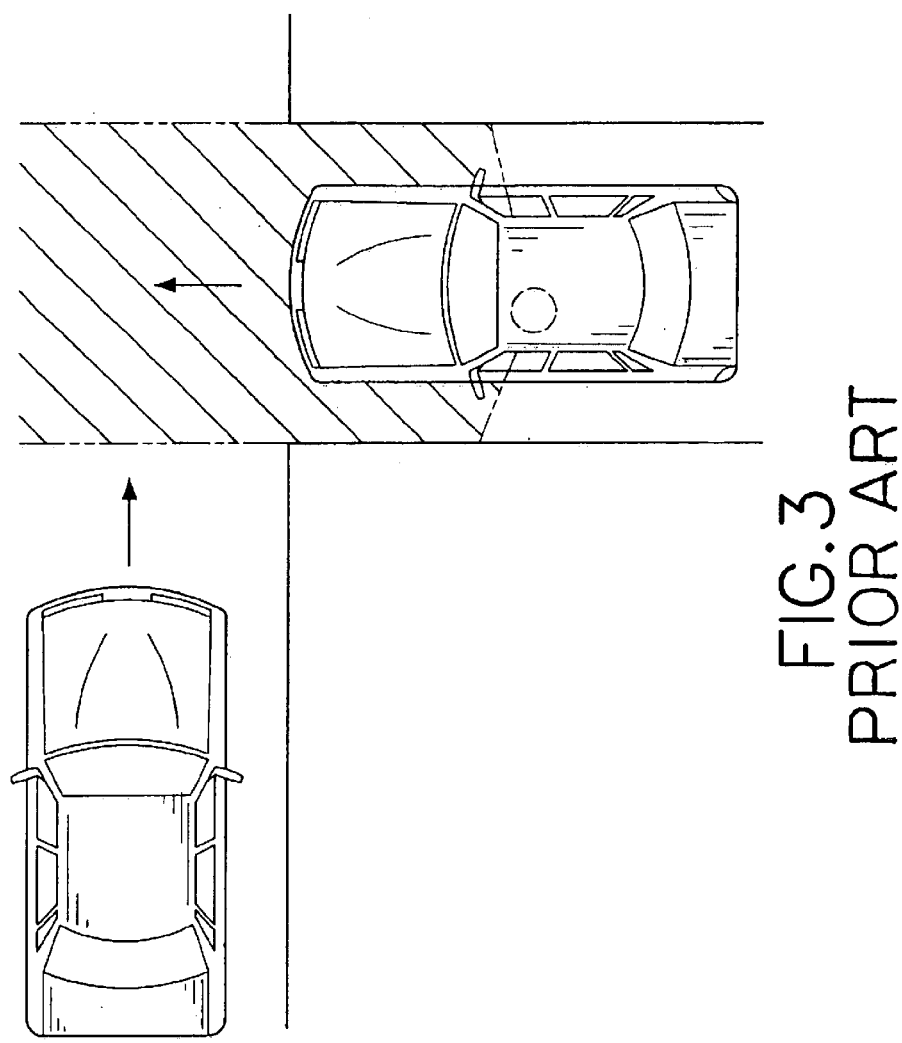
FIG. 3 is a diagram showing the viewing angle of a car approaching from a blind intersection using conventional viewing aids.

From the foregoing, the present invention provides an advanced road condition detection system, in which the micro-cameras installed at the nose of the car and the micro-camera having wide-angle lens at the rear end of the car can provide useful video images to inform the driver of road conditions in front and behind the car. This design enables drivers to expand their view considerably without having to stick out their heads through the window or pulling out half way and risk the chance of a car accident with on-coming traffic, as depicted in FIG. 2.

The present invention can also incorporate the speed recorder (40) and the backing sensor (50) into the system. The speed recorder (40) is used to register the car speed, working in conjunction with the controller (30). When the passenger car is travelling at high speed, the current speed will be displayed on the data display unit (20); when the passenger car slows down to a preset level, the controller (30) will order the data display unit (20) to split up the display screen to show the video images captured by the left and right front image capture units (11, 12) simultaneously and discontinue displaying the speed of the vehicle.

When traveling at a low speed, the driver can manually select one of the image capture units (11-13) for viewing depending on actual needs, or can activate all image capture units (11–13) for simultaneous viewing through window splitting. When traveling at high speed, the current speed of the car will be displayed by screen overlaying on the data display unit (20), and the rear image capture unit (13) will be simultaneously activated for monitoring of the road conditions from behind by window splitting.

The present invention can also incorporate the GPS unit (60), such that an electronic road map can be displayed on the data display unit (20) through window splitting for tracking the current location of the car and charting a road map through the synchronous satellite services.

Since the left and right image capture units (11, 12) are embedded in the left and right bead lamp sets, this design not only allows the micro-cameras to be positioned at the nose of the car for best viewing, but also benefits from the physical protection of the lamp shell from water, dust and moisture, thus the service life of the operating units can be considerably extended.

The foregoing description of the preferred embodiments of the present invention is intended to be illustrative only and, under no circumstances, should the scope of the present invention be so restricted.

What is claimed is:

1. A driver information feedback and display system comprising:

multiple image capture units disposed at a front end and a rear end of a vehicle to capture exterior peripheral scenes of the vehicle;

a data display unit for outputting video images fed from the left and right front image capture units and the rear image capture unit;

a channel/window manager for controlling window splitting and view switching through the control of video channels, having multiple video input ports respectively connected to left and right front image capture units and rear image capture unit, and an output port to the data display unit for video output; and a controller connected to the data display unit and the channel/window manager, to act as a control center for the window display mode through control of the video input ports and the output port.

2. The driver information feedback and display system as claimed in claim 1, wherein the left and right front image capture units are embedded in left and right head lamp sets of the vehicle.

3. The driver information feedback and display system as claimed in claim 1, wherein the rear image capture unit is a micro-camera with a wide-angle lens.

4. The driver information feedback and display system as claimed in claim 1, wherein the controller is further linked to a speed recorder, such that when the vehicle speed drops to a preset level, the controller will automatically activate the left and right front image capture units for fill scanning.

5. The driver information feedback and display system as claimed in claim 1, wherein the controller is further linked to a backing sensor for obstacle detection and distance estimation.

6. The driver information feedback and display system as claimed in claim 4, wherein the controller is further linked to a backing sensor for obstacle detection and distance estimation.

7. The driver information feedback and display system as claimed in claim 1, wherein controller is further linked to a GPS unit, such that an electronic map is displayed on the screen of the data display unit by window splitting for tracking the current location and charting the electronic map dynamically through the synchronous satellite services.

* * * * *